US006961064B2

(12) United States Patent
Bushey

(10) Patent No.: US 6,961,064 B2
(45) Date of Patent: Nov. 1, 2005

(54) SYSTEM AND METHOD FOR COMBINING GRAPHICS FORMATS IN A DIGITAL VIDEO PIPELINE

(75) Inventor: Robert D Bushey, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 321 days.

(21) Appl. No.: 09/896,793

(22) Filed: Jun. 28, 2001

(65) Prior Publication Data

US 2003/0001851 A1 Jan. 2, 2003

(51) Int. Cl.[7] .............................................. G09G 5/397
(52) U.S. Cl. ..................................... 345/546; 345/629
(58) Field of Search ................................ 345/562, 421, 345/424, 506, 586, 546, 502, 418, 426, 619, 505, 863, 568, 501, 634, 641, 629, 563; 370/389; 709/201, 200; 715/500; 712/42; 716/16; 711/147

(56) References Cited

U.S. PATENT DOCUMENTS 5,598,525 A * 1/1997 Nally et al. ................. 345/546
5,861,893 A * 1/1999 Sturgess ...................... 345/562
5,943,064 A * 8/1999 Hong .......................... 345/546
5,977,960 A   11/1999 Nally et al. ................. 345/191

* cited by examiner

Primary Examiner—Matthew C. Bella
Assistant Examiner—Dalip K. Singh

(57) ABSTRACT

Generally, graphics are displayed on a monitor or printed on an output device after a series of steps are performed, typically implemented in the form of a graphics pipeline, in the case of an object-oriented graphic image. Similarly, a digital picture or digital video image passes through a digital pipeline for the digital image or images to be displayed, printed, or otherwise processed. The present invention encompasses a system and method in which the stages of the graphics pipeline used to process a graphic object are interconnected to the stages of the digital pipeline used to process a bit-mapped image so that a single, interconnected pipeline can be used to process object-oriented graphic images, bit map images and/or images which contain graphics and bit map portions. This interconnected pipeline can be used to process images through various stages of the graphics pipeline followed by stages typically contained in the digital pipeline, or vice versa, to create desired effects. This interconnected pipeline includes a switch or a selectively configurable interconnection matrix which defines an image path which connects desired stages of the pipeline.

25 Claims, 1 Drawing Sheet

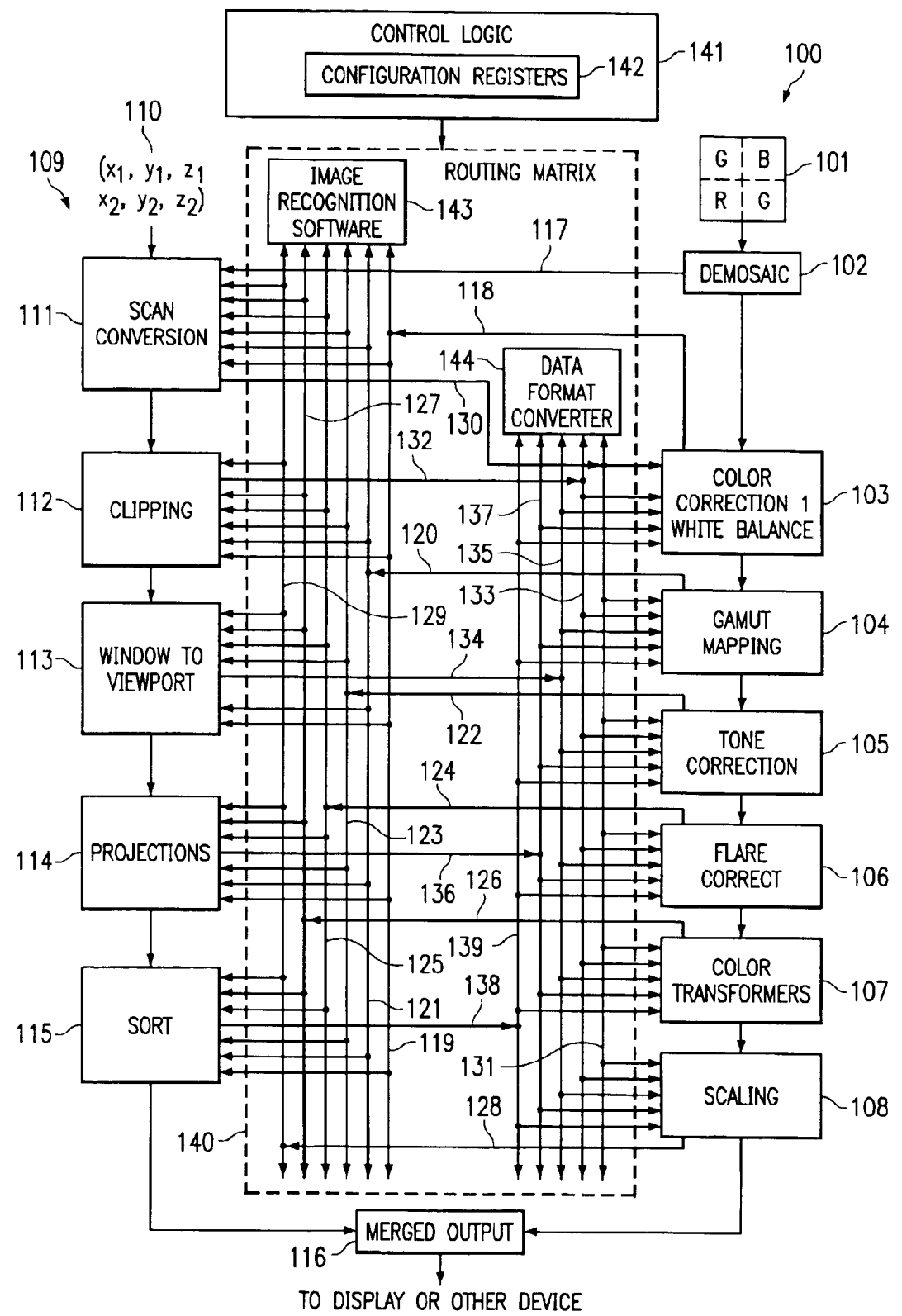

SYSTEM AND METHOD FOR COMBINING GRAPHICS FORMATS IN A DIGITAL VIDEO PIPELINE

TECHNICAL FIELD

The present invention relates in general to image processing, and in particular to an apparatus for and method of combining object-oriented graphics and raster graphics processing pipelines.

BACKGROUND

Images can typically be represented and displayed using either of two types of imagery information: raster graphics (or bit map data) and graphic objects. Typically, digital images generated by a computer are displayed on a display device (monitor) using a color triad of red, green, and blue (RGB) phosphorous dots. A computer display is made up of rows and columns of pixels. Each pixel is a triad of phosphorous dots (RGB). The intensities of the red, green and blue in each pixel is controlled to simulate various colors on the computer display device. A digital picture is displayed on a computer display device by addressing each triad of three dots constituting a pixel and defining the RGB intensities.

The pixel illumination information is sent as raw raster data from the computer to the display and consists of intensities of the RGB pixels starting with, typically, the upper left hand pixel on the computer screen, followed by intensity values for the red, green, and blue pixels in each of the subsequent pixel groups in that first row along the top of the computer screen. Once the top row is completed, the raw raster data continues with the left most pixel in the second row of the computer screen and similarly each group of pixels contained within the computer screen is supplied with an intensity value for each of the pixels in the pixel group from the raw raster data. In this manner, the computer generates a digital picture which is displayed on the computer screen which appears as a picture to an observer. This pattern of pixel illumination information is typically referred to as a "bit map" or a "bit-mapped" image, in other words each pixel on the screen is mapped to a value stored in a two dimensional memory array corresponding to the pixel layout of the display, each memory element storing a corresponding pixel luminance value from 0 to 255.

Input devices, such as digital cameras and camcorders may use a Bayer filter implementing a Bayer pattern of four color sensors grouped together with the upper left hand sensor being sensitive to green, the upper right hand sensor being sensitive to blue, the lower left hand sensor being sensitive to red and the lower right hand sensor being sensitive to green. The sensor elements repeat in a known pattern. The Bayer pattern described is a standard input sensor color format for the orientation of the red, green, and blue pixels but one of ordinary skill would understand that various permutations of this pattern are possible and used throughout the computer industry.

The computer can perform a number of processes or steps on the raw bit map image captured from a sensor to increase the aesthetic value of the overall image. For instance, the color resulting from the field of four sensor Bayer groups (determined by the intensities of the sensors themselves) can be compared to the color of surrounding sensors and the derived RGB triad intensity values can be established and adjusted to ensure that a gradual changing of color occurs, for instance in the coloration of the face of a person, as would be eventually displayed as a digital picture. Together these individual steps in adjusting the color resulting from sensors or pixel groups, through adjusting the intensities of the color elements establish a bit map pipeline or raw raster pipeline. The bit map image which make up the digital image is, to the computer, a series or string of color intensity values.

A computer may also typically generate a graphic image using object-oriented graphics to generate one or more graphic primitives such as points, lines, polygons, alphanumeric characters, special symbols and fonts, etc., and combine these basic graphic primitives to represent the overall image. For instance, a square, being a standard graphic primitive object would be represented as data required to construct such a square, such as size, location, line and fill color, etc., so as to constitute a square graphics image. However, a person included in a graphics image would be composed of a number of individual graphic primitives which, when grouped together, appear as a person or some other complex object consisting of a plurality of primitives. Recognition software exists today which will transform a bit map or raster graphics digital image into an object-oriented graphic representation of the digital image. These algorithm vary in capability and the graphical representation of the digital image is a direct function of the capability of the algorithm used in the conversion. For instance, if this algorithm is used on the digital image of a person, the quality of the appearance of the graphic image of the person is a direct function of the quality of the algorithms which convert the raster digital image of the person into an object-oriented graphical representation of the person.

Once a digital image is converted to an object-oriented graphical representation, the computer can alter the position and orientation of the various primitives which represent the digital image to simulate motion of the graphical representation. For instance, if a digital image of a person were converted to a graphical representation, the orientation of the object-oriented graphical primitive objects which are used to represent the legs of the person may be varied to simulate a person walking. As the complexity of the graphical images and the simulated motion improve, the quality of the overall graphic image approaches a real or non-synthetic image.

The graphic data to be displayed on a computer screen passes through a number of stages in order to improve the overall appearance of the image. In other words, the graphic image can be passed through a graphics pipeline which will enhance the appearance of the resulting overall graphic image, perform various corrections and assemble primitive elements and constituent components into a unified image.

As previously discussed, the images displayed on a computer screen normally result from either an object-oriented graphic image or a bit map (raster scan) image. If bit map images are displayed, a bit map or raster pipeline is used to adjust the color intensities of the pixels before the image is displayed on the computer screen. If graphic object-oriented images are displayed, the graphical images are passed through a graphics pipeline to assemble the primitives into a composite image for viewing. While prior art systems have segregated portions or windows on the screen in which a bit map image or an object-oriented graphic image can be displayed, similar to the "picture-in-picture" feature of modern televisions, the image within an area or window of the screen is still either a bit map image or an object-oriented graphic image because those images come through different graphic pipes.

Problems exists when it is desired to effectively and efficiently process both object-oriented (i.e., vector) and bit map (i.e., raster) graphics and images interchangeably.

SUMMARY OF THE INVENTION

The need for effectively and efficiently processing both object-oriented and bit map graphics and images is achieved by a system for and method of combining both object-oriented (or "vector") graphics and raster scan (or "bit-mapped" or "bit map" image) pipelines so that image data can be processed by selected stages of either and/or both pipelines. That is, an object-oriented graphics pipeline may include several processing stages configured to sequentially process graphics data, the graphics data may include data to generate one or more graphic primitives, such as points, lines, polygons, alphanumeric characters, special symbols and fonts, etc. Examples of possible graphic processing stages in the object-oriented graphic pipeline may include some combination or subcombination of scan conversion, clipping, windowing to viewport, projection, sorting and/or may include other or substitute functionalities and others. Similarly, a bit-mapped or raster scan pipeline may include several processing stages configured to sequentially process bit-mapped data representing an image as a plurality of pixel luminance values and/or other pixel characteristics. These bit-mapped or raster scan pipeline processing stages may include some combination or subcombination of demosaicing, color correction/white balancing, gamut mapping, tone correction, flare correction, color transformation, scaling and/or may include other or substitute functionalities and others. Advantageously, the processor provides for selective sequencing through each pipeline and for "cross-over" of data between stages of each pipeline including any necessary data conversion (e.g., polygon recognition and conversion of bit-mapped images to form object-oriented graphic data, and similar conversion of object-oriented graphic format data into a bit map data format.)

BRIEF DESCRIPTION OF THE DRAWING

The FIGURE is a block diagram of a combined pipeline according to an embodiment of the invention in which stages of a bit map pipeline are interconnected with stages of a graphics pipeline.

DETAILED DESCRIPTION

According to one aspect of the invention, an image processor may include an object-oriented graphics pipeline having a first plurality of stages configured to process a graphic object, and a bit map image pipeline having a second plurality of stages configured to process a bit map image. An interconnection may be selectively configurable to provide an output from one of the stages of one of the pipelines (i.e., either the graphics or the bit map image pipeline) to an input of a selected or default next stage (if any) of the same pipeline or to a selected stage (or stages) of the other pipeline. According to a feature of the invention, each of the first plurality of stages (i.e., stages of the graphics pipeline) may perform a different function, the functions including (but not necessarily limited to) one or more of the group including scan conversion, clipping, windowing to viewport, projection, and sorting. Similarly, according to another feature of the invention, each of the second plurality of stages (i.e., the stages of the bit map image pipeline) may perform a different function, the functions including (but not necessarily limited to) one or more of the group including: demosaicing, color correction/white balancing, gamut mapping, tone correction, flare correction, color transformation, and scaling.

According to another feature of the invention, an output stage may be connected to an output from each of the pipelines (e.g., from a selected stage of both the graphic and bit map image pipelines). The interconnection between the pipelines may include a switching matrix configurable to route outputs from one or more of the first plurality of (graphics) stages to a designated or selected next one of the first plurality of (graphics) stages and to a selected one of the second plurality of (bit map image) stages. Similarly, the switching matrix may be configured to route outputs from some of the second plurality of (bit map image) stages to a next one of the second plurality of (bit map image) stages and to a selected one of the first plurality of (graphics) stages. According to another feature of the invention, the graphics pipeline is configured to receive graphics data including graphics identification and location data and the bit-mapped image pipeline is configured to receive a raster scanned image data representing pixel luminance information. A data format converter may be included and configured to convert between an object-oriented graphics data format and a bit map image data format, i.e., unidirectionally from one, or bidirectionally from either format to the other.

According to another feature of the invention, an image recognition stage may be configured to identify and encode object-oriented graphic images within the bit-mapped image. For example, the recognition stage may recognize primitive elements and shapes including polygons, polyhedrons, lines, planes, curves, arcs, points, vectors, characters, symbols, and other primitives and composite graphic structures within a bit map or raster based representation and convert the same into an appropriate object-oriented graphic data representation. The conversion may include deletion of the converted portions from the original bit map image so that a remaining portion of the latter can be appropriately processed while the converted objects are subject to graphics pipeline processing. A common instruction decoder may be included, operable to control the interconnection (e.g., a switching matrix) to route at least one of the graphic objects and the bit-mapped image object between both the graphics and bit-mapped image pipelines.

According to another aspect of the invention, a method of processing an image may include selective configuration of one or more stages of an object-oriented graphics pipeline and one or more stages of a bit map image pipeline. The resultant configuration may cause an output from one of the stages of one of the pipelines to be supplied to an input of one of the stages of the other of the pipelines and processing an image by transmission of the image through at least one of the stages of each pipeline.

According to a feature of the invention, processing performed by each of the graphics pipeline stages may be different from processing performed by the other stages of that pipeline and may be selected from among (but is not limited to) the group of processing including scan conversion, clipping, windowing to viewport, projection, and sorting. Similarly, processing performed by each of the stages of the bit map image pipeline may be different from processing performed by the other stages and may be selected from among (but is not limited to) the group of processing including demosaicing, color correction/white balancing, gamut mapping, tone correction, flare correction, color transformation, and scaling.

According to another feature of the invention, a combining step may form a merged output from signals or data supplied by outputs of both pipelines.

According to another feature of the invention, the step of selectively configuring the pipelines may include alternatively routing outputs from one or more stages to a next one of the stages or to a selected one of the stages of the other pipeline. Object-oriented graphics data may be passed by the graphics pipeline in a format including graphics identification and location data, and/or raster scanned (or bit map) image data representing individual pixel characteristics (e.g., luminance, color, or other pixel display information, etc.) may be passed by the bit map image pipeline. A conversion step may be included to transform between an object-oriented graphics data format and a bit-mapped image data format (i.e., performs data conversion in either one or both directions). An image recognition step may provide for identification and encoding of the graphic images within the bit-mapped image. According to another feature of the invention, a step of controlling an interconnection provides routing of either (or both) of the graphic object and the bit-mapped image object between the graphics and bit map image pipelines.

According to another aspect of the invention, a processor may include two pipelines means, a first pipeline means may include a plurality of graphic image processing means for processing an object-oriented graphic object, a second pipeline means including a plurality of a bit map image processing means for processing a bit-mapped image. Interconnection means may selectively connect an output from one of processing means of one of the pipeline means to an input of one of the processing means of the other of the pipeline means. Digital imaging requires processing a bit map image using a bit map or raster pipeline to obtain a displayable image including red, green and blue pixel information. The bit map pipeline includes a number of steps in which the resulting image is corrected or manipulated to ensure that an accurate, representative and pleasing image is displayed. For example, a digital video display typically displays thirty digital image frames per second with each digital image passing through the raster pipeline as described below. The computer displaying a digital image, or full or partial motion digital video, interprets the digital picture or pictures as a combination of intensity values for the pixels which make up the digital image to be displayed on the computer display monitor. Without additional processing, the computer does not recognize objects contained within the digital image or video.

The computer can, however, perform limited modifications of bit map digital images. Since the computer interprets the digital image as a series of intensity values, the computer can increase or reduce intensity values to darken or reduce displayed resulting colors respectively.

The FIGURE illustrates a combined pipeline which includes the processing stages of both the bit map pipeline as well as the processing stages of the object-oriented graphics pipeline according to an embodiment of the invention. Interconnections are included within the combined pipeline which allow the output of one stage of the pipeline to be directed to another stage of the pipeline for further processing. For example, an image in the form of Bayer pattern bit map image 101 is shown entering a traditional bit map pipeline 100 at demosaic stage 102. Demosaic stage 102 converts the Bayer pattern input elements red, green and blue triad intensities for each pixel and compensates for artifacts (the influence of previously supplied intensity values). In a traditional bit map pipeline the output intensity values of demosaic stage 102 would pass into color correction and white balance stage 103. Within color correction and white balance stage 103 the processing software examines the overall white balance of the bit map to ensure that the constituent colors forming each pixel which are intended to be combined to appear white have the correct intensities for the combination to actually appear as white. Additionally, the intensities of other colors are corrected by adjusting the intensities of the red, green and blue components so the displayed color matches, as closely as possible, the actual colors intended.

Different devices produce specific colors differently, and gamut mapping stage 104 corrects for coloring differences between various platforms. This compensation corrects differences between various devices, such as computer screens, printers, plotter, or any other device in which the image may be displayed or recorded. The purpose of gamut mapping 104 is to eliminate differences which may occur from one color space to another color space so that the resulting colors in the digital image are produced accurately. In other words, a digital image which is displayed on a computer screen should have the same coloring as a printed copy of the digital image; gamut mapping stage 104 is intended to enhance faithful rendering of the image.

Tone correction stage 105 is also included in the video pipeline to eliminate or reduce color variations from pixel to pixel when both pixels represent the same color. For instance, if in the center of a diagram is a square red box, where the color of the box is consistent throughout, tone correction will check the constituent pixel color components of the square red box and adjust the intensities of the red, green and blue components to be identical.

Flare correction stage 106 is also included in the raw image pipeline to control the effects of white light in the original image and how that white light effects the resultant image. For instance, if part of the square red box discussed above was illuminated with a white spotlight while another portion of the square red box was outside the light from the spotlight, the presence of the white spotlight should not affect the shade of red on the square red box, only the illumination of that portion of the red box itself. Flare correction stage 106 adjusts the intensities of each color component so that resulting colors remain proportionately correct between pixels in other lighting conditions.

Color transformation stage 107 compensates for variations in color in a single object and scaling stage 108 is included in the video pipeline to scale the digital image for the desired display or output device. It is important to note that the steps contained in bit map pipeline 100 of the combined pipeline are given by way of example of possible raster or bit map image processing and division of such processing into discrete stages as might be used to process a specific digital image may not be necessary during the processing of each and every digital image displayed. Additionally, bit map pipeline 100 included in the combined pipeline is but one sequence in which the processing steps may occur. For example, tone correction stage 105 may occur prior to gamut mapping stage 106. Gamut mapping 106 requires information about the intended output devices. Gamut mapping may, in some instances, be the last step in bit map pipeline 100. The sequence of stages, and even the number of stages, a specific digital image is processed through within the bit map pipeline is flexible. According to one embodiment, each of the discussed stages is preferably included in the bit map pipeline to provide a desired correction.

Also contained within the combined pipeline structure is object-oriented graphics pipeline 109. An initial object-oriented graphics image, such as line 110, defined through two end points x1, y1 and z1 and x2, y2 and z2, enters graphics pipeline 109 at scan conversion stage 111. For a line, scan conversion stage 111 would algorithmically draw an imaginary line which represents all points along line 110. Once the line is algorithmically determined, the pixels constructing the image of the line are identified and rendered. Rendering is the term used to describe the creation of the image using geometric models and using color and shading to give the image a realistic look. The overall function of scan conversion stage 111 may also include the process of transforming a linkless geometric description of a shape, such as a polygon to render an image of a polygon.

Clipping stage 112 occurs when an image window is defined and portions of the rendered image, which lie outside the specified image window, are removed from the rendered image. The clipping stage includes the application of a number of possible algorithms. Clipping can use windows of user defined size and shapes to intelligently remove portions of the image outside the defined space.

Within window to viewport stage 113 orthogonal coordinates are defined, typically u and v, to define a space which encompasses the graphic image. Once the space is defined, the space is normalized by applying a set of algorithms which perform a geometric transformation on the defined space. The normalized space is used to minimize the complexity of the projection performed in projection stage 114.

Projections stage 114 defines various projections, or viewpoints, for viewing a graphic object and the portion of the graphic object viewed from the various viewpoints. In projections stage 114 the normalized geometric shape is paired with a center of projection, from which a ray is projected and the portions of the geometric shape are identified that are visible from that center of projection. For instance, a back clipping plane may be defined in which a projection of the image is generated which includes the shape of the image as it would appear from the back or behind the image. Similarly, a front clipping plane may be defined in which a projection of the image, as it would appear from the front, is captured. These projections can be from a two dimensional point of view or from a three dimensional point of view. Typically a parallel projection is used in which the center projection is defined to be at infinity. The parallel projection allows the projection of the object to appear as if the viewpoint was a plane parallel to the surface of the object rather than from a single point in space. The center of projection may be predefined or determined by the user.

Sort stage 115 typically is placed after a view reference point is defined. The view reference point defines the point from which the projection of the object will be displayed on the display screen. Once the view reference point is defined, the projections of the image which have been created by projections stage 114 are sorted to identify the correct projection from the view reference point. For example, one of the algorithms used in sort stage 115 is a backface culling algorithm which eliminates surfaces which would be behind the graphical object from the reference viewpoint. Sort stage 115 represents the family of algorithms which determine the portions of the graphical image which will be shown. A depth sorting algorithm is typically also included to consider various depths of the graphical object and display as appropriate. The view reference point may be predefined or determined by the user.

The outputs of the object-oriented graphic pipeline 109 and raster pipeline 100 are combined to form merged output 116. The merged output may be either from the final output stage of the graphics pipeline 109 or the raster pipeline 100. Alternatively, the merged output may be outputs from both the pipelines interleaved by appropriate means. Merged output 116 can then be displayed on the computer screen or by any other device.

The combined pipeline includes cross-connections 117–139 forming routing matrix 140 and which resides between the stages of the raster pipeline and the stages of the graphic pipeline. Routing matrix 140 is controlled by control logic 141 including configuration registers 142 used to define interconnections between and among pipeline stages as implemented in routing matrix 140. Control logic 141 may include an automatic control of the path the specific image data may follow through the combined pipeline. This path may be controlled by application software settings (predefined or user controlled), operating systems setting (predefined or user controlled) or based on preestablished rules dependent on the characteristics of the image data, input device and/or the output device.

These connections allow the image data from each pipeline to be converted into a combined image and processed by any of the stages contained in the combined pipeline. For example, once demosaic stage 102 has finished processing, the resulting bit map image data may be a sequence of color intensity values representing the digital image. These intensity values can be sent via path 117 to scan conversion stage 111. At scan conversion stage 111 the image, consisting of a series of RGB values, will be processed in order for the software to recognize the object-oriented graphic objects contained within the bit map image. This object recognition software resides in stage 143 and is bidirectionally connected to the output of the stages contained in bit map pipeline 100. For example, if the original digital image is that of a person, numerous pixels 101 are processed by demosaic stage 102. This string of pixels can be sent to scan conversion stage 111 after processing of digital image and the image of the person contained in the digital image is transformed into a series of object-oriented geometric shapes (e.g., primitives) that approximate the original bit map digital image. Once the transformation has been performed, scan conversion stage 111 transforms the geometric objects into a three-dimensional representation of the person contained in the digital image. The three-dimensional representation can then be processed by any of the remaining stages of the graphics pipeline as appropriate.

Alternatively, instead of routing matrix 140, routing of data between and among the various pipeline stages may be accomplished by including routing information appended to or otherwise associated with the image data to be processed, e.g., as a routing tag defining a path through the combined pipelines.

Conversely, when a graphic primitive in the form of line 110 is received by scan conversion stage 111, a three dimensional representation of that line is typically the end result of the scan conversion. If the user would like to send that three dimensional line to color correction/white balance stage 103, the three dimensional line would be converted to bit map representation which represents the line in a digital format. This conversion is preformed by data format converter 144 which is bidirectionally connected to the output of each stage of object-oriented graphics pipeline 109. This RGB four pixel representation could then be sent through any of the remaining stages of the bit map pipeline 100 for enhancement.

Alternatively, and preferably, a combined format can be created which contains the favorable attributes of the two methods of representing images, the ability for the computer to recognize and manipulate objects of the object-oriented graphics format, and the ability to accurately depict the image on the computer screen through the bit map image format. This combined format would eliminate the necessity of converting the image from a graphical representation to an RGB pixel representation each time the user directs the image to a stage typically contained in the bit map pipeline and convert the image from an RGB bit map representation to an object-oriented graphical (or polygon) representation when using stages from the graphic pipeline. This combined format is preferably a mapping between the RGB raster space and the object-oriented graphic space, or may consist of a superset of the two formats.

What is claimed is:

1. An image processor comprising:
   a graphics pipeline including a first plurality of stages configured to process a graphic object,
   a bit map image pipeline including a second plurality of stages configured to process a bit-mapped image, and
   a selectively configurable interconnection matrix defining an image path for providing selected outputs from one or more of said stages of one of said pipelines to selected inputs of one or more of said stages of the other of said pipelines.

2. The image processor according to claim 1 wherein each of said first plurality of stages is different from the others and is selected from among the group of stages including scan conversion, clipping, windowing to viewport, projection, and sorting.

3. The image processor according to claim 1 wherein each of said second plurality of stages is different from the others and is selected from among the group of stages including demosaicing, color correction/white balancing, gamut mapping, tone correction, flare correction, color transformation, and scaling.

4. The image processor according to claim 1 further comprising an output stage connected to an output from each of said pipelines.

5. The image processor according to claim 1 wherein said interconnection comprises a switching matrix configurable to:
   route outputs from one or more of said first plurality of stages to a next one of said first plurality of stages or to a selected one of said second plurality of stages; and
   route outputs from one or more of said second plurality of stages to a next one of said second plurality of stages or to a selected one of said first plurality of stages.

6. The image processor according to claim 1 wherein said graphics pipeline is configured to receive graphics data including graphics identification and location data and said bit-mapped image pipeline is configured to receive a raster scanned image data representing pixel luminance information.

7. The image processor according to claim 1 further comprising a data format converter configured to convert between a graphics data format and a bit-mapped image data format.

8. The image processor according to claim 1 further comprising an image recognition stage configured to identify and encode graphic images within said bit-mapped image.

9. The image processor according to claim 1 further including a common instruction decoder operable to control said interconnection to route at least one of said graphic object and said bit-mapped image object between both said graphics and bit-mapped image pipelines.

10. A method of processing an image comprising the steps of:
    selectively configuring a pipeline interconnection matrix to establish an image path through one or more stages of a graphics pipeline and one or more stages of a bit map image pipeline; and
    processing an image by transmission along said image path through at least one stage of each pipeline.

11. The method according to claim 10 wherein processing performed by each of said stages of said graphics pipeline is different from processing performed by the others and is selected from among the group of processing including scan conversion, clipping, windowing to viewport, projection, and sorting.

12. The method according to claim 10 wherein processing performed by each of said stages of said bit map image pipeline is different from processing performed by the others and is selected from among the group of processing including demosaicing, color correction/white balancing, gamut mapping, tone correction, flare correction, color transformation, and scaling.

13. The method according to claim 10 further including a step of combining outputs from each of said pipelines into a merged output.

14. The method according to claim 10 wherein said step of selectively configuring said pipelines includes one of:
    alternatively routing outputs from one or more stages of one of said pipelines to a next one of said stages or to a selected one of said stages of the other pipeline.

15. The method according to claim 10 wherein further including steps of passing graphics data including graphics identification and location data to said graphics pipeline and passing raster scanned image data representing pixel characteristic information to said bit map image pipeline.

16. The method according to claim 10 further comprising a step of converting between a graphics data format and a bit-mapped image data format.

17. The method according to claim 10 further comprising a step of image recognition including identification and encoding of said graphic images within said bit-mapped image.

18. The method according to claim 10 further including a step of controlling an interconnection to route at least one of said graphic object and said bit-mapped image object between both said graphics and bit map image pipelines.

19. An image processor comprising:
    a first pipeline including a plurality of graphic image processors for processing a graphic object,
    a second pipeline including a plurality of a bit map image processor for processing a bit-mapped image, and
    a switch for selectively connecting an output from any one of said processors to an input of any other one of said processors.

20. The image processor according to claim 19 wherein:
    a processing function performed by each of said graphic processors is different from a processing function performed by any other graphic processor and at least one of said processing functions is selected from among the group of processes including scan conversion, clipping, windowing to viewport, projection, and sorting; and
    a processing function performed by each of said bit map image processor is different from a processing function performed by any other bit map processors, processing functions is selected from among the group of processes including demosaicing, color correction/white balancing, gamut mapping, tone correction, flare correction, color transformation, and scaling.

21. A processor comprising:

a first pipeline including a first plurality of stages configured to process a first object, a second pipeline including a second plurality of stages configured to process a second object, and a plurality of interconnects that connects each stage of first plurality of stages with at least one other stage in the first pipeline and with a third plurality of stages in the second pipeline, and connects each stage of second plurality of stages with at least one other stage in the second pipeline and with a fourth plurality of stages in the first pipeline.

22. The processor of claim 21 further comprising:

a converter configured to convert between a data format of the first object and a data format of the second object.

23. The processor of claim 21 further comprising:

a recognition stage configured to identify and encode the first object within the second object.

24. The processor of claim 21 further comprising:

an output stage connected to an output from each of the pipelines.

25. The processor of claim 24 further comprising:

a final stage of the first pipeline that is connected to each stage of the second plurality of stages and the output stage; and a final stage of the second pipeline that is connected to each stage of the first plurality of stages and the output stage.

* * * * *